United States Patent [19]

Gessell et al.

[11] 4,067,822

[45] Jan. 10, 1978

[54] HIGH EFFICIENCY COMPLEX CATALYST FOR POLYMERIZING OLEFINS

[75] Inventors: Donald Earl Gessell, Baton Rouge, La.; Gaylon Le Roy Dighton; Luis Daniel Valenzuela-Bernal, both of Lake Jackson, Tex.

[73] Assignee: The Dow Chemical Company, Midland, Mich.

[21] Appl. No.: 699,293

[22] Filed: June 23, 1976

[51] Int. Cl.$^2$ .......................... C08F 4/64; C08F 4/62
[52] U.S. Cl. ............................ 252/429 B; 526/159; 526/161
[58] Field of Search ............ 252/429 B, 429 C, 431 R

[56] References Cited

U.S. PATENT DOCUMENTS

| | | | |
|---|---|---|---|
| 3,634,340 | 1/1972 | Gunther et al. ............. | 252/429 B X |
| 3,769,373 | 10/1973 | Reed et al. .................. | 252/429 C X |
| 3,784,481 | 1/1974 | Lassau et al. ................ | 252/429 B X |
| 3,943,067 | 3/1976 | Chan et al. .................. | 252/429 C X |
| 3,966,637 | 6/1976 | Witte et al. .................. | 252/429 B |

*Primary Examiner*—Patrick P. Garvin
*Attorney, Agent, or Firm*—James G. Carter

[57] ABSTRACT

Compositions exhibiting high catalytic activity in the polymerization of α-olefins are provided by mixing a dinitrogen and/or dihydrogen complex of a transition metal such as titanium with a conventional Ziegler catalyst such as the reaction product of titanium tetrachloride and aluminum triethyl. Polymerization processes employing this catalyst composition do not require conventional catalyst removal steps in order to provide polymers having suitable color and other physical characteristics.

11 Claims, No Drawings

HIGH EFFICIENCY COMPLEX CATALYST FOR POLYMERIZING OLEFINS

BACKGROUND OF THE INVENTION

This invention relates to a new catalyst composition useful for initiating and promoting polymerization of α-olefins and to a polymerization process employing such a catalyst composition.

It is well known that olefins such as ethylene, propylene, and 1-butene can be polymerized in the presence of metallic catalysts, particularly the reaction products of organometallic compounds and transition metal compounds to form substantially unbranched polymers of relatively high molecular weight. Typically such polymerizations are carried out at relatively low temperatures and pressures. The resulting generally linear olefin polymers are characterized by greater stiffness and higher density than olefin polymers having highly branched polymer chains.

Among the methods for producing linear olefin polymers, some of the most widely utilized are those described by Professor Karl Ziegler in U.S. Pat. Nos. 3,113,115 and 3,257,332. In these methods, the catalyst employed is obtained by admixing a compound of a transition metal of Groups 4b, 5b, 6b and 8 of Mendeleev's Periodic Table of Elements with an organometallic compound. Generally the halides and oxyhalides of titanium, vanadium and zirconium are the most widely used transition metal compounds. Outstanding examples of the organometallic compounds include hydrides, alkyls and haloalkyls of aluminum, alkyl aluminum halides, Grignard reagents, alkali metal aluminum hydrides, alkali metal borohydrides, alkali metal hydrides, alkaline earth metal hydrides and the like.

Usually, polymerization is carried out in a reaction medium comprising an inert organic liquid, e.g., an aliphatic hydrocarbon, and the aforementioned catalyst. One or more olefins may be brought into contact with the reaction medium in any suitable manner, and a molecular weight regulator, which is normally hydrogen, is usually present in the reaction vessel in order to control the molecular weight polymers.

Following polymerization, it is common to remove catalyst residue from the polymer by separating the polymer from the inert liquid diluent and then repeatedly treating the polymer with an alcohol or similar deactivating agent. Such catalyst deactivation and/or removal procedures are expensive both in time and material consumed as well as the equipment required to carry out such treatment.

Furthermore, most of the aforementioned known catalyst systems are more efficient in preparing polyolefins in slurry (i.e., wherein the polymer is not dissolved in the carrier) than in solution (i.e., wherein the temperature is high enough to solubilize the polymer in the carrier). The lower efficiencies of such catalysts in solution polymerization is generally believed to be caused by the general tendency of such catalyst to become rapidly depleted or deactivated by significantly higher temperatures than are normally employed in solution processes.

In view of the expense of removing catalyst residues from the polymer, it would be highly desirable to provide a polymerization catalyst which is sufficiently active, even at solution polymerization temperatures, to produce such high quantities of polymer per unit of catalyst that it is no longer necessary to remove catalyst residue in order to obtain polymer of the desired purity.

SUMMARY OF THE INVENTION

The present invention, in one aspect, is a catalyst composition which is the catalytic mixture of (a) a hydrocarbon soluble dinitrogen and/or dihydrogen complex of a transition metal (hereinafter called TM1) wherein the complex contains coordinate covalent bonds to the molecular nitrogen or molecular hydrogen and (b) a conventional Ziegler catalyst comprising a compound of a transition metal (hereinafter called TM2) and a reducing compound of a non-transition metal (hereinafter called M). The proportions of the foregoing components of said catalytic mixture are such that the atomic ratio of TM1 to TM2 is within the range from about 0.001:1 to about 1000:1, the atomic ratio of M to TM1 is within the range from about 0.1:1 to about 100:1 and the atomic ratio of M to TM2 is as in conventional Ziegler catalysts, e.g., from about 0.1:1 to about 100:1.

In a second aspect, the invention is a process for polymerizing an α-olefin under conditions characteristic of Ziegler polymerization wherein the aforementioned reaction product is employed as the catlyst.

Surprisingly, it is found that the addition of the dinitrogen or dihydrogen complex to any Ziegler catalyst increases the catalyst efficiency of the particular Ziegler catalyst by at least 50 percent. Accordingly, olefin polymers produced in accordance with the foregoing process generally contain lower amounts of catalyst residues than polymers produced in the presence of conventional catalysts.

DETAILED DESCRIPTION OF THE EMBODIMENT

The present invention is most advantageously practiced in a polymerization process wherein an α-olefin is polymerized, generally in the presence of hydrogen, in a polymerization zone containing an inert diluent and the catalytic mixture described herein. The foregoing polymerization process is most beneficially carried out under inert atmosphere and at relatively low temperature and pressure, although very high pressures are optionally employed.

Olefins which are suitably polymerized or copolymerized in the practice of this invention are generally the α-olefins having from 2 to 18 carbon atoms. Illustratively, such α-olefins include ethylene, propylene, butene-1, pentene-1, 3-methylbutene-1, hexene-1, octene-1, dodecene-1, octadecene-1 and the like. It is understood that α-olefins may be copolymerized with other α-olefins and/or with small amounts, i.e. up to about 10 weight percent based on the polymer, of other ethylenically unsaturated monomers such as butadiene, isoprene, 1,3-pentadiene, styrene, α-methyl styrene and the like.

The novel catalyst composition of the present invention is beneficially the catalytic mixture of (a) a hydrocarbon soluble dinitrogen or dihydrogen complex of a compound of a transition metal (TM1) of Groups 4b, 6b, 7b or 8 of Mendeleev's Periodic Table of Elements and (b) a conventional Ziegler catalyst comprising the heterogeneous catalyst obtained by mixing (1) a reducing agent which is a metal, an alloy, a metal hydride or an organometallic compound wherein the metal component is a metal (M) of Groups 1a, 2a, 2b, or 3a of Mendeleev's Periodic Table of Elements and (2) a reducible compound of a transition metal (TM2) of Groups 4b, 5b, 6b, 7b and 8 of Mendeleev's Periodic Table of Elements. The foregoing catalyst composition has an atomic ratio of TM1 to TM2 in the range from about 0.001:1 to about 1000:1. In preferred catalyst compositions, the most desired atomic ratios of TM1 to TM2 varies with the particular transition metals employed as TM1 and TM2 and the amount of aluminum or other non-transition metal which may be present in the complex. For example, the TM1:TM2 atomic ratio is preferably in the range from about 0.001:1 to 0.1:1 if titanium is employed as TM1 and the dinitrogen complex contains a significant amount (i.e., Al/Ti atomic ratio >0.25:1) of aluminum. Most preferably, the TM1:TM2 atomic ratio is in the range from about 0.01:1 to about 0.05:1. If the complex contains less than a significant amount of Al (usually less than 10 ppm Al) or similar non-transition metal, then TM1:TM2 is most preferably in the range of 0.01:1 to 1000:1, most preferably 0.05 to 0.2. If zirconium is employed as TM1, the TM1:TM2 atomic ratio is preferably in the range from about 0.001 to about 10, especially from about 0.01 to about 1. The atomic ratio of M to TM2 is as common in Ziegler catalysts, usually in the range from about 0.1:1 to about 100:1, preferably from about 0.3:1 to 10:1.

The dinitrogen complex of the present invention is broadly characterized as a complex comprising a transition metal, anionic groups and molecular nitrogen and/or molecular hydrogen. With the exception of divalent nickel compounds, the transition metal of the complex has an oxidation state or valence greater than two. In all complexes of this invention, the molecular nitrogen or molecular hydrogen forms a coordinate covalent bond with the transition metal. The anionic groups of the complex are preferably halide, most preferably chloride or bromide. The number of anionic groups is sufficient to satisfy the valence charge on the transition metal. Due to the high reactivity and instability of the dinitrogen complexes under conditions required for detailed structural analysis, such complexes are not further characterized as to structure. In preferred, dinitrogen complexes, it is believed that the ratio of atoms of the transition metal to molecular nitrogen and/or molecular hydrogen is from about 1:0.3 to about 1:3, more preferably from about 1:1 to about 1:3, most preferably about 1:1, and the atomic ratio of transition metal atoms to anionic groups is from about 1:2 to about 1:4, preferably about 1:3. Such complexes are generally soluble in hydrocarbon solvents and should be maintained under an atmosphere of nitrogen, hydrogen or mixture thereof depending upon whether molecular nitrogen, molecular hydrogen or combination thereof is part of the complex. For example, a complex having molecular nitrogen and no molecular hydrogen is preferably kept under a nitrogen atmosphere.

The dinitrogen complex is prepared by reacting, in the absence of a reducing agent, molecular nitrogen or molecular hydrogen in an inert organic diluent with a transition metal compound, preferably a transition metal halide, which compound contains no coordinate covalent bond.

Exemplary transition metal compounds include, for example, the halides, such as the chlorides, bromides, iodides and fluorides, of the transition metals of Groups 4b, 6b, 7b and 8 of Mendeleev's Periodic Table of Elements as set forth in *Handbook of Chemistry and Physics*, CRC, 48th Edition (1967–68). Exemplary metals are titanium, chromium, zirconium, tungsten, manganese, molybdenum, ruthenium, rhodium, cobalt, nickel and platinum, with titanium and zirconium being preferred. In the most advantageous embodiments, the transition metal compound is insoluble in hydrocarbon diluents and is rendered soluble by the formation of the dinitrogen complex. Exemplary preferred transition metal compounds are titanium trichloride, zirconium tetrachloride, tungsten hexachloride, molybdenum pentachloride, nickel dichloride, with the halides, particularly the chlorides, of titanium being most preferred.

The reaction to form the complex is advantageously carried out in an inert organic diluent at temperatures in the range from ambient to about 200° C by pressuring nitrogen or hydrogen gas into a reactor containing the transition metal (TM1) compound dispersed in the inert diluent. Advantageously, this reaction is carried out in the absence of a reducing agent for the transition metal. For purposes of this invention, an inert organic diluent is an organic fluid that does not prevent formation of the complex and is non-reactive with the complex once it is formed. Accordingly, liquid hydrocarbon such as the aliphatic and aromatic hydrocarbons are useful diluents with the acyclic aliphatic hydrocarbons being preferred. Examples of suitable inert organic diluents include hexane, isooctane, octane, isononane, nonane, decane, cyclohexane, benzene, 2,2,5-trimethyl hexane and mixtures thereof. Preferred diluents are mixtures of isoparaffins, especially those having 8 to 9 carbon atoms per molecule. Pressures employed in the reaction normally range from about 40 to about 300 psig, preferably from about 60 to about 150 psig, with nitrogen and/or hydrogen gas constituting at least 10 mole percent, preferably from about 50 to 100 mole percent, and especially from about 90 to 100 mole percent of the gas phase in the reaction vessel. Although concentration of transition metal (TM1) compound dispersed in the inert diluent is not particularly critical, it is generally desirable to employ concentrations in the range from about 0.1 to about 10, preferably from about 1 to 10, weight percent of transition metal (TM1) compound in the inert diluent.

In cases wherein the transition metal compound is insoluble in the organic diluent, it is desirable to agitate the reaction mixture during the reaction to maintain the insoluble compound dispersed in the diluent. In all cases, sufficient agitation to insure thorough mixing of the components is a desirable practice since it promotes contact between the molecular nitrogen and/or hydrogen and the transition metal (TM1) compound.

In an especially preferred method for preparing the dinitrogen complex, a Friedel-Crafts catalyst is employed, usually in amounts from about 5 to about 50 weight percent based on the transition metal halide, to accelerate the reaction and to increase yield of dinitrogen complex. Examples of preferred Friedel-Crafts catalysts for this purpose are aluminum trichloride and aluminum trifluoride. Other known Friedel-Crafts catalysts may be suitably employed.

The time required to form significant amounts of the dinitrogen complex varies with the conditions of the reaction as well as the particular transition metal compound. Generally a reaction time in the range from about 1 to about 8 hours, preferably from 1 to 2 hours, is sufficient when operating under the conditions of temperature and pressure described hereinbefore.

Following the reaction, the hydrocarbon-soluble dinitrogen complex is recovered from the reaction mixture by decanting the supernatant of the reaction mixture from the insoluble transition metal residues and/or by filtering the solid residue and recovering the filtrate.

Transition metals (TM2) of the Ziegler catalyst are the conventional ones of Groups 4b, 5b, 6b, 7b and 8 of the Periodic Table such as titanium, zirconium, hafnium, thorium, uranium, vanadium, columbium, tantalum, chromium, molybdenum, tungsten and iron. Examples of the compounds of these metals which may be used as catalyst components include halides, such as chlorides or bromides, oxyhalides such as oxychlorides, complex halides such as complex fluorides, freshly precipitated oxides or hydroxides, and organic compounds such as alcoholates (often called alkoxides or esters), acetates, benzoates or acetyl acetonates. The preferred compounds are those of titanium, zirconium, thorium, uranium and chromium. Titanium compounds are particularly preferred, for example, titanium halides such as titanium tetrachloride and titanium trichloride; titanates such as tetrabutoxytitanium, tetra(isopropoxy)titanium, or tri(isopropoxy)titanium, dibutoxytitanium dichloride, tetraphenoxytitanium and the like. Titanium trichloride, particularly titanium trichloride which is co-crystallized with aluminum trichloride such as $\Delta TiCl_3 \cdot 1/3 AlCl_3$ is most preferred. This co-crystallized titanium complex is readily prepared by the reduction of titanium tetrachloride with metallic aluminum and other methods disclosed in U.S. Pat. No. 3,342,793 to Palvarini et al.

Exemplary reducing agents are those of conventional Ziegler catalysts including metals such as aluminum, sodium and lithium; hydrides such as lithium hydride, sodium borohydride; Grignard reagents such as phenylmagnesium bromide; and preferably organometallic compounds, especially alkyl aluminum compounds. For the purposes of illustration, the especially preferred alkyl aluminum compounds can be represented by the general formula RAlYY' wherein R is alkyl, most advantageously containing from 1 to 12 carbon atoms; Y is selected from the group consisting of alkyl, most advantageously from 1 to 12 carbon atoms, and hydrogen; and Y' is selected from the group consisting of alkyl, most advantageously from 1 to 12 carbon atoms, hydrogen, and halogen, e.g., chlorine or bromine, with the proviso that when Y' is halogen Y is alkyl.

Examples of especially preferred compounds corresponding to the formula, RAlYY', include trimethylaluminum, triethylaluminum, triisobutylaluminum, tri-n-butylaluminum, tri-n-pentylaluminum, triisooctylaluminum, tri-n-decylaluminum, tri-n-dodecylaluminum, diethylaluminum chloride, diethylaluminum hydride and the like. Especially preferred are triethylaluminum, and triisobutylaluminum. Other organometallic compounds which are likewise suitable include butyllithium, amylsodium, phenylsodium, dimethylmagnesium, diethylmagnesium, diethylzinc, butylmagnesium chloride and phenylmagnesium bromide.

In addition to the essential transition metal component and the reducing component, the Ziegler catalyst also may contain other adjuvants and catalyst support materials conventionally employed in Ziegler catalysts.

An especially preferred composition is one having as the Ziegler catalyst 1) a co-crystallized titanium trichloride-aluminum chloride complex, e.g., $\Delta TiCl_3 \cdot 1/3 AlCl_3$, and 2) an aluminum trialkyl or dialkyl aluminum halide, e.g., aluminum triethyl, aluminum triisobutyl and diethyl aluminum chloride and as the dinitrogen complex a dinitrogen complex of a co-crystallized titanium trichloride-aluminum chloride complex.

The novel catalyst composition is desirably prepared in an atmosphere free of moisture and oxygen, such as in a gas atmosphere of nitrogen, argon, helium, hydrogen and the like.

In one embodiment, the Ziegler catalyst is first prepared in a conventional manner by dissolving each of the catalyst components in an inert organic liquid vehicle such as hexane, pentane, isooctane, isononane, mixtures thereof and the like. The solutions of the catalyst components are then added to each other forming a slurry which is subsequently combined with the aforementioned dinitrogen complex to form the novel catalyst composition. While not necessary, it is sometimes desirable to wash the hydrocarbon-insoluble component of the Ziegler catalyst with the organic vehicle and then to activate the catalyst by adding fresh reducing agent to the washed product. This activated catalyst is then combined with the dinitrogen complex.

In the preparation of the novel catalyst composition, the dinitrogen complex can be combined with the Ziegler catalyst before or simultaneous with polymerization. In preferred practice, the dinitrogen complex and Ziegler catalyst are mixed prior to polymerization. While the manner of combining the Ziegler catalyst and the dinitrogen complex is not particularly critical, it is generally desirable to add the dinitrogen complex to the conventional Ziegler catalyst in order to achieve maximum catalyst efficiency. The resultant mixture including hydrocarbon soluble as well as the insoluble portions is added to the polymerization zone. In some instances, it may be desirable to separate the hydrocarbon soluble from insoluble portions of the catalyst composition and employ the insoluble portion alone or in combination with fresh dinitrogen complex or fresh reducing agent. While not as preferred as the foregoing addition techniques, the dinitrogen complex and the Ziegler catalyst are added via separate streams into the polymerization zone.

In the preparation of the catalyst composition by any of the foregoing methods, it is preferred to carry out such preparation in the presence of an inert diluent. By way of an example of suitable inert organic diluents can be mentioned liquefied ethane, propane, isobutane, n-butane, n-hexane, the various isomeric hexanes, isooctane, isononane, paraffinic mixtures of alkanes having from 8 to 9 carbon atoms, cyclohexane, methylcyclopentane, dimethylcyclohexane, dodecane, industrial solvents composed of saturated or aromatic hydrocarbons such as kerosene, naphthas, and mixtures of any two or more of the foregoing, especially when freed of impurities, characteristically poison Ziegler catalysts, and especially those having boiling points in the range from about −50° to about 200° C. Also included as suitable inert diluents are benzene, toluene, ethylbenzene, cumene, decalin and the like.

Mixing of the catalyst components to provide the desired catalyst composition is advantageously carried out under an inert atmosphere such as nitrogen, hydrogen, argon or other inert gas at temperatures in the range from about −100° to about 200° C, preferably from about −20° to about 50° C. While the period of mixing is not critical, it is found that a very desirable catalyst composition most often occurs within about 5 minutes or less.

In the polymerization process employing the aforementioned catalyst composition, polymerization is effected by adding a catalytic amount of the novel catalyst composition in the premixed form or as separate components, e.g., the dinitrogen complex and the Ziegler catalyst, to a polymerization zone containing α-olefin monomer, or vice versa. The polymerization zone is maintained at temperatures in the range from about 0° to about 300° C, preferably at solution polymerization temperatures (e.g., from about 110° to about 300° C), for a residence time of about 10 minutes to several hours, preferably from 15 minutes to 1 hour. It is generally desirable to carry out the polymerization in the absence of moisture and oxygen. A catalytic amount of the catalyst composition is advantageously within the range from about 0.0001 to about 1 milligram-atom titanium per liter of diluent. It is understood, however, that the most advantageous catalyst concentration depends upon polymerization conditions such as temperature, pressure, solvent and presence of catalyst poisons. It is further understood that the foregoing range is given to obtain maximum catalyst yields. In the polymerization process, a carrier which may be an inert organic diluent or solvent or excess monomer is generally employed. In order to realize the full benefit of the high efficiency catalyst of the present invention care must be taken to avoid oversaturation of the solvent with polymer. If such oversaturation occurs before the catalyst becomes depleted, the full efficiency of the catalyst is not realized. For best results, it is preferred that the amount of polymer in the carrier not exceed about 50 weight percent based on the total weight of the reaction mixture. Inert diluents employed in the polymerization recipe are suitably as defined as hereinbefore.

The polymerization pressures usually employed are relatively low, e.g., from about 100 to about 500 psig. However, polymerization within the scope of the present invention can occur at pressures from atmospheric up to pressures determined by the capabilities of the polymerization equipment. During polymerization it is very desirable to stir the polymerization recipe to obtain better temperature control, to maintain uniform polymerization mixtures throughout the polymerization zone, and to insure contact between the olefin and the catalyst.

Hydrogen is often employed in the practice of this invention to lower molecular weight of the resultant polymer. For the purpose of this invention, it is beneficial to employ hydrogen in concentrations ranging from about 0.001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The monomer or mixture of monomers is contacted with the catalyst composition in any conventional manner, preferably by bringing the catalyst composition and monomer together with intimate agitation provided by suitable stirring or other means. In the case of more rapid reactions with more active catalysts, means can be provided for refluxing monomer and solvent, if any of the latter is present, and thus remove the heat of reaction. In any event, adequate means should be provided for dissipating the exothermic heat of polymerization. If desired, the monomer can be brought in the vapor phase into contact with the catalyst composition, in the presence or absence of liquid material. The polymerization can be effected in the batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is reduction of the catalyst residues remaining in the polymer. Often, the resultant polymer is found to contain insignificant amounts of catalyst residue that catalyst removal procedures can be entirely eliminated.

The following examples are given to illustrate the invention, and should not be construed as limiting its scope. All parts and percentages are by weight unless otherwise indicated.

GENERAL OPERATING PROCEDURE FOR WORKING EXAMPLES

In the following examples the catalyst preparations are carried out in the absence of oxygen or water in a nitrogen or hydrogen filled glass container. The catalyst components are used as diluted solutions in Isopar E ® (a mixture of saturated isoparaffins having 8 to 9 carbon atoms). The polymerization reactions are carried out in one gallon (3.9 liters) stainless steel stirred batch reactor at 150° C unless otherwise stated. In such polymerization reactions 2 liters of dry oxygen-free Isopar E ® are added to the reactor and heated to 150° C. The reactor is vented to about 25 psig and 15 to 25 psi of hydrogen is added for polymer molecular weight control. Then, 120 psi of ethylene is added to the reactor and the ethylene pressure is set to maintain the reactor pressure at 150–200 psig. The catalyst is then pressured into the reactor using nitrogen and the reactor temperature is maintained for the desired polymerization time. The polymerization reactor contents are dumped into a stainless steel beaker and allowed to cool. The resulting slurry is filtered and the polymer dried and weighed. The ethylene consumption during polymerization is recorded with a DP cell which shows the rate of polymerization and the amount of polymer produced.

EXAMPLE 1

In a 500-ml. round bottom flask, a 15-g portion of $\Delta TiCl_3 \cdot 1/3AlCl_3$ is refluxed with 200 ml. of Isopar E ® (a mixture of saturated isoparaffins having 8 to 9 carbon atoms) at 120° C for two hours in a nitrogen atmosphere at atmospheric pressure. The delta titanium chloride aluminum chloride complex ($\Delta TiCl_3 \cdot 1/3AlCl_3$) is prepared by reducing $TiCl_4$ with metallic aluminum. The Isopar E ® is purged with nitrogen to remove oxygen and then dried with molecular sieves.

The reaction mixture is then cooled, decanted and filtered to remove solid residue including unreacted $\Delta TiCl_3 \cdot 1/3AlCl_3$. Analysis of the resulting filtrate for titanium and aluminum indicates 566 ppm Ti and less than 7 ppm Al. Analysis of the foregoing filtrate for nitrogen by the Kjeldahl method and infrared spectroscopy indicates presence of nitrogen as Ti-N≡N (II bonded) and confirms a dinitrogen complex of titanium ($TN_2$). A solution of the dinitrogen complex ($TN_2$ solution) is prepared by mixing 3.3 ml. of 0.4M tri-n-decylaluminum and 3.3 ml. of the foregoing dinitrogen complex (556 ppm Ti) in 93 ml. Isopar E ®.

A conventional Ziegler catalyst is prepared by mixing 92 ml. of Isopar E®, 5 ml. of 0.05 molar ΔTiCl₃·1/3 AlCl₃ and 2.6 ml. of 0.4 molar of tri-n-decylaluminum.

The catalyst composition is prepared by mixing in a syringe 20 ml. of the aforementioned $TN_2$ solution and 1 ml. of the Ziegler catalyst solution.

Into a stirred one gallon liter jacketed stainless steel batch reactor is added two liters of Isopar E ®, 15 psi of hydrogen, 120 psi of ethylene, and the entire 21 ml. ($\sim 2.78 \times 10^{-4}$ g. Ti) of the above catalyst composition. The temperature is controlled at 150° C and ethylene pressure is set to maintain the reactor pressure at 160 psig. Total reaction time is 60 minutes yielding 80 grams of polyethylene indicating a catalyst efficiency of $2.75 \times 10^5$ grams of polymer per gram of Ti.

In a control run following the foregoing polymerization procedure except that no $TN_2$ solution is employed, the catalyst efficiency is $4 \times 10^4$ grams of polymer per gram of Ti.

EXAMPLE 2

The procedure of Example 1 is repeated except that 1.6 ml. of the filtrate containing the dinitrogen titanium complex is employed in preparing the $TN_2$ solution and the polymerization time is 30 minutes. The resultant catalyst efficiency is $2.4 \times 10^5$ grams of polymer per gram of titanium.

EXAMPLE 3

Example 1 is repeated substituting 3.3 ml. of 0.918 M triethylaluminum in n-heptane for the 3.3 ml. of 0.4M tri-n-decylaluminum. The resulting catalyst efficiency is $1.95 \times 10^5$ grams of polymer per gram of titanium.

EXAMPLE 4

A sample of $TN_2$ solution is prepared by refluxing 15 g. TiCl₃, 5 g. AlCl₃ and 400 ml. Isopar E ® in a nitrogen atmosphere. The resultant solution, which contains 110 ppm Ti and 75 ppm Al, is combined with a mixture of 2.5 ml., of 0.05 M ΔTiCl₃·1/3AlCl₃ in Isopar E ®, 1.5 ml. of 0.25 M triethylaluminum and Isopar E ® in varying proportions wherein the volume of Isopar E ® is that volume required to make a final catalyst volume of 100 ml. The resulting catalyst compositions are employed in a polymerization procedure as described in Example 1 and the results are recorded in Table I.

TABLE I

| Run No. | TN₂ Solution ml. | Catalyst Efficiency g. polymer/g. Ti | Reaction Time hrs. |
|---|---|---|---|
| 1 | 0.5 | 111,000 | 2 |
| 2 | 1.0 | 179,000 | 2 |
| 3 | 2.0 | 93,500 | 2 |
| 4 | 4.0 | 60,500 | 1 |
| 5 | 8.0 | 38,000 | 0.75 |
| 6 | 16.0 | 17,000 | 0.5 |
| 7 | 32.0 | 19,300 | 0.75 |
| 8 | 64.0 | 21,000 | 1 |

EXAMPLE 5

A dinitrogen complex of zirconium ($ZN_2$) is prepared by refluxing 3.0 g. ZrCl₄, 1 g. AlCl₃ and 400 ml. Isopar E ® in a nitrogen atmosphere at 120° C for 6 hours. The refluxed mixture is cooled and filtered and the filtrate is found to contain 300 ppm Zr and 90 ppm Al. A 10-ml. portion of this $ZN_2$ filtrate is added to a mixture of 5 ml. 0.025 M ΔTiCl₃·1/3AlCl₃, 2.1 ml. 0.24 M tri-n-decylaluminum and 83 ml. Isopar E ®. A 20 ml. portion of the resulting catalyst is employed in a polymerization procedure as described in Example 1. A catalyst efficiency of $9.16 \times 10^4$ of polymer/g Ti is observed.

What is claimed is:

1. A catalytic mixture of (A) a hydrocarbon soluble complex of a halide of a transition metal (TM1) wherein the complex contains at least one coordinate covalent bond to molecular nitrogen or hydrogen and (B) a conventional Ziegler catalyst comprising a transition metal (TM2) compound selected from the group consisting of halides, oxyhalides, oxides, hydroxides, alcoholates, acetates, benzoates and acetylacetonates; and a non-transition metal (M) or a compound of a non-transition metal (M) as a reducing agent, the proportions of the foregoing components of said catalytic mixture being such that the atomic ratio of the transition metal (TM1) of the complex to the transition metal (TM2) of the Ziegler catalyst is within the range from about 0.001:1 to about 1000:1, and the atomic ratio of the metal (M) of the reducing agent to the transition metal of the complex is within the range from about 0.1:1 to about 100:1 and wherein (TM1) and (TM2) are independently selected from groups 4o, 6b, 7b or 8 of Mendeleev's Periodic Table of Elements and (M) is selected from groups 1a, 2a, 2b or 3a of said table.

2. The catalytic mixture of claim 2 wherein TM1 and TM2 are titanium and the metallic reducing agent is an organoaluminum compound having the formula RAlYY' wherein R is alkyl, Y is alkyl or hydrogen and Y' is alkyl, hydrogen or halogen provided that when Y' is halogen Y is alkyl.

3. The catalyst of claim 1 wherein (TM1) and (TM2) are independently selected from the group consisting of titanium, chromium, zirconium, tungsten, manganese, molybdenum, ruthenium, rhodium, cobalt, nickel and platinum and the reducing compound is a metal or compound of the metal selected from the group consisting of aluminum, sodium and lithium.

4. The catalyst of claim 4 wherein the transition metal compounds (TM1) are selected from the group consisting of titanium trichloride, zirconium tetrachloride, tungsten hexachloride, molybdenum pentachloride and nickel dichloride; the transition metal compounds (TM2) are selected from titanium trichloride, titanium tetrachloride, tetra(isopropoxy) titanium, tri(isopropoxy)titanium, dibutoxy titanium dichloride and tetraphenoxy titanium and the reducing metal compound is selected from the group consisting of lithium hydride, sodium borohydride trimethylaluminum, triethylaluminum, triisobutylaluminum, tri-n-butylaluminum, tri-n-pentylaluminum, triisooctylaluminum, tri-n-decylaluminum, tri-n-dodecylaluminum, diethylaluminum chloride, diethylaluminum hydride, butyllithium, amylsodium, phenylsodium, dimethylmagnesium, diethylmagnesium, diethylzinc, butylmagnesium chloride and phenylmagnesium bromide.

5. The catalytic mixture of claim 5 wherein the atomic ratio of TM1 to TM2 is in the range from about 0.001:1 to 0.101.

6. The catalytic mixture of claim 3 wherein the atomic ratio of TM1 to TM2 is in the range from about 0.01:1 to 0.05:1.

7. The mixture of claim 7 wherein the complex contains a coordinate covalent bond to nitrogen.

8. The mixture of claim 8 wherein the transition metal halide of the complex is a titanium trichloride.

9. The mixture of claim 9 wherein the titanium trichloride is a titanium trichloride-aluminum chloride complex.

10. The mixture of claim 10 wherein the Ziegler catalyst is the reaction product of a titanium trichloride aluminum chloride complex and an aluminum trialkyl wherein alkyl has from 1 to 12 carbon atoms.

11. The mixture of claim 1 wherein TM1 is zirconium.

* * * * *

UNITED STATES PATENT AND TRADEMARK OFFICE
CERTIFICATE OF CORRECTION

PATENT NO. : 4,067,822
DATED : Jan. 10, 1978
INVENTOR(S) : D. E. Gessell, et al., It is certified that error appears in the above-identified patent and that said Letters Patent are hereby corrected as shown below:

Col. 2, line 25 change "catlyst" to -- catalyst --.
Col. 8, line 50 change "to" to -- or --.
Col. 10, line 26 change "Claim 2" to -- Claim 1 --.
Col. 10, line 40 change "Claim 4" to -- Claim 3 --.
Col. 10, line 50 place a comma between "borohydride" and "trimethylaluminum".
Col. 10, line 58 change "Claim 5" to -- Claim 4 --.
Col. 10, line 60 change "0.101" to -- 0.1:1 --.
Col. 10, line 61 change "Claim 3" to -- Claim 2 --.
Col. 10, line 65 change "Claim 7" to -- Claim 6 --.
Col. 10, line 67 change "Claim 8" to -- Claim 7 --.
Col. 11, line 1 change "Claim 9" to -- Claim 8 --.
Col. 11, line 4 change "Claim 10" to -- Claim 9 --.

Signed and Sealed this

Twenty-third Day of May 1978

[SEAL]

Attest:

RUTH C. MASON
Attesting Officer

LUTRELLE F. PARKER
Acting Commissioner of Patents and Trademarks